United States Patent
Kong

(10) Patent No.: US 10,252,658 B2
(45) Date of Patent: Apr. 9, 2019

(54) CUP HOLDER AND MANUFACTURING METHOD THEREOF

(71) Applicants: Hyundai Motor Company, Seoul (KR); Kia Motors Corporation, Seoul (KR)

(72) Inventor: Byung Seok Kong, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/591,543

(22) Filed: May 10, 2017

(65) Prior Publication Data

US 2018/0162258 A1 Jun. 14, 2018

(30) Foreign Application Priority Data

Dec. 13, 2016 (KR) .................. 10-2016-0169194

(51) Int. Cl.
  *B60N 3/00* (2006.01)
  *B60N 3/10* (2006.01)
  *B29C 45/16* (2006.01)
  *B29K 23/00* (2006.01)

(52) U.S. Cl.
  CPC .......... *B60N 3/108* (2013.01); *B29C 45/1676* (2013.01); *B29K 2023/10* (2013.01); *B60Y 2410/122* (2013.01)

(58) Field of Classification Search
  CPC .......... B60N 3/108; B60N 3/10; B60N 3/102

USPC .............................. 248/311.2, 313
See application file for complete search history.

(56) References Cited

U.S. PATENT DOCUMENTS

| | | | | |
|---|---|---|---|---|
| 7,380,762 B2* | 6/2008 | Takeichi | ............... | B60N 3/106 248/309.1 |
| 7,487,945 B2* | 2/2009 | Liu | ............... | B60N 3/106 224/926 |
| 7,520,482 B2* | 4/2009 | Shin | ............... | B60N 3/106 224/926 |
| 7,866,620 B2* | 1/2011 | Kaemmer | ............... | B60N 3/106 224/282 |
| 8,360,380 B2* | 1/2013 | Soma | ............... | B60N 3/101 224/926 |
| 8,733,724 B2* | 5/2014 | Voigt | ............... | B60N 3/101 220/703 |
| 9,004,332 B2* | 4/2015 | Kodama | ............... | B60N 3/10 220/737 |
| 9,561,745 B2* | 2/2017 | Sawada | ............... | B60N 3/10 |
| 9,796,317 B2* | 10/2017 | Neumann | ............... | E05D 15/0604 |

* cited by examiner

*Primary Examiner* — Steven M Marsh
(74) *Attorney, Agent, or Firm* — Morgan, Lewis & Bockius LLP

(57) ABSTRACT

A cup holder for a vehicle may include a holder body having an upper surface opened and having a receiving space formed therein, a guide movable to inside the holder body, and an elastic member provided on at least a portion of the guide and an external circumferential surface of the holder body. The elastic member is integrally formed with the holder body by injection molding.

15 Claims, 12 Drawing Sheets

CUP HOLDER AND MANUFACTURING METHOD THEREOF

CROSS-REFERENCE(S) TO RELATED APPLICATIONS

The present application claims priority to Korean Patent Application No. 10-2016-0169194, filed on Dec. 13, 2016, the entire contents of which is incorporated herein for all purposes by this reference.

BACKGROUND OF THE INVENTION

Field of the Invention

Embodiments of the present invention relate to a cup holder and a manufacturing method thereof, and more particularly, to a cup holder which has an improved structure and a manufacturing method thereof.

Description of Related Art

Generally, various devices are provided in a vehicle for the convenience of the driver and the passenger. For example, there is a glovebox for storing various items, an armrest for resting arms, and a cup holder for holding beverage containers such as cans, bottles, and cups.

The cup holder is usually disposed at the center console located in front of the driver's seat and passenger's seat, at a glovebox located between the driver's seat and passenger's seat, or at a tray located in front of the glovebox. The driver and the passenger may keep various types of beverage containers such as cans, bottles, and cups in the cup holder.

In addition, the cup holder may be disposed at various positions in the vehicle such as the door trim, an armrest, the back of the front seat, and the back of the glovebox so that passengers in the rear seat may use it.

The cup holder includes a holder body having an open top receiving recess to store a container in the receiving recess, and a guide disposed at the holder body which guides the container to be inserted into the holder body and tightly supports the side surface of the container stored in the holder body.

As an example of such a cup holder, a plurality of guides may be provided on the inner side surface of the receiving recess of the holder body. Each guide may be disposed on the inner side surface of the receiving recess of the holder body to elastically protrude or rotate. These guides elastically protrude or rotate in the direction of the inside of the receiving recess to tightly support the side surface of the container in the receiving recess. For the elastic operation of the guide, an elastic member is disposed between the guide and the holder body or between the guide and the guide housing integrally formed to the holder body.

The elastic member may be a torsion spring in the form of a coil spring, and the elastic restoring force of the spring is a force for elastically protruding or rotating the guide toward the inside of the receiving recess.

The elastic restoring force of the spring acts in a direction in which the guide contacts the side surface of the container, so that the guide has an adhesive force and a supporting force to the container.

A protrusion is formed on the guide, and a slot into which the protrusion of the guide is inserted is formed in the holder body (or the guide housing). The protrusion is guided by the slot, and the guide protrudes or rotates.

Such a conventional cup holder has a large number of parts such as a holder body, a guide housing, a guide, and a spring, and has a large number of steps for assembly, thereby increasing material costs and manufacturing costs.

Further, the conventional cup holder has a problem of noise due to the spring when the guide is operated when the cup is housed, and noise due to friction between the slot and the protrusion, and has a problem of an uneven operating force according to the shape of the container.

U.S. Pat. No. 5,839,711 teaches a cup holder to which a spring ring type guide operation method is applied. In the present cup holder, a jaw is elastically operated by a common spring ring. In the case of the spring ring type, it is possible to reduce the number of parts and simplify the assembling process, thereby achieving a cost reduction. Further, since the elastic force of the spring ring is employed, it is possible to minimize the noise and equalize the operating force. However, since a process of assembling the guide and the spring ring is required, there is still a disadvantage in terms of the number of processes during manufacturing.

The information disclosed in this Background of the Invention section is only for enhancement of understanding of the general background of the invention and should not be taken as an acknowledgment or any form of suggestion that this information foul's the prior art already known to a person skilled in the art.

BRIEF SUMMARY

Various aspects of the present invention are directed to providing a cup holder and a manufacturing method thereof which may reduce the number of parts and assembling steps, and reduce the cost.

Various aspects of the present invention are directed to providing a cup holder and a manufacturing method thereof which may prevent the cup from slipping and enhance the aesthetics of the holder.

Additional aspects of the present invention will be set forth in part in the description which follows, and, in part, will be obvious from the description, or may be learned by practice of the present invention.

In accordance with one aspect of the present invention, a cup holder for a vehicle includes a holder body having an opening on an upper surface thereof and a receiving space formed therein, a guide configured to be movable to the inside of the holder body, and an elastic member disposed on at least one guide and the external circumferential surface of the holder body. The elastic member is formed integrally with the holder body by injection molding.

The elastic member may be exposed to at least a portion of the external circumferential surface of the holder body.

The elastic member may be exposed to at least a portion of the external surface of the guide.

The guide may include a pair of side surfaces extending toward the center of the holder body, a front surface connecting the pair of side surfaces and forming a curved surface protruding in a forward direction, and an elastic member mounting portion including an opening formed on at least a portion of the front surface.

The guide may further include a hinge configured to be rotatable with respect to the holder body.

The elastic member may be overmolded behind of the hinge.

The elastic member mounting portion may further include a first opening formed on a bottom surface of the holder body in a circumferential direction, a second opening formed on a side surface of the holder body in a vertical direction thereof, and a third opening formed on the side surface of the holder body in a horizontal direction.

The elastic member may include a first elastic member disposed at the first opening, a second elastic member disposed at the second opening, a third elastic member disposed at the third opening, and a fourth elastic member disposed at the opening of the guide.

Each of the first opening and the second opening may be disposed in plural.

The elastic member may include at least one of thermoplastic olefin and thermoplastic elastomer.

In accordance with another aspect of the present invention, a method of manufacturing a cup holder includes a first injection molding for forming a holder body by injecting a polypropylene material into a first mold, placing the holder body inside a second mold, and a second injection molding for integrally forming an elastic member by injecting an elastic material into the second mold. The elastic member is disposed on at least a portion of the holder body.

The elastic member may be exposed to at least a portion of the external circumferential surface of the holder body.

The method may further include forming a guide when forming the holder body, the guide having a hinge configured to allow that the guide to move inside of the holder body.

The elastic member may be exposed to at least a portion of the external surface of the guide.

The guide may include a pair of side surfaces extending toward the center of the holder body, a front surface connecting the pair of side surfaces and forming a curved surface protruding in a forward direction, and an elastic member mounting portion including an opening formed on at least a portion of the front surface.

The elastic member may be overmolded behind of the hinge.

The elastic member mounting portion may further include a first opening formed on a bottom surface of the holder body in a circumferential direction, a second opening formed on a side surface of the holder body in a vertical direction thereof, and a third opening formed on the side surface of the holder body in a horizontal direction.

Each of the first opening and the second opening may be disposed in plural.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
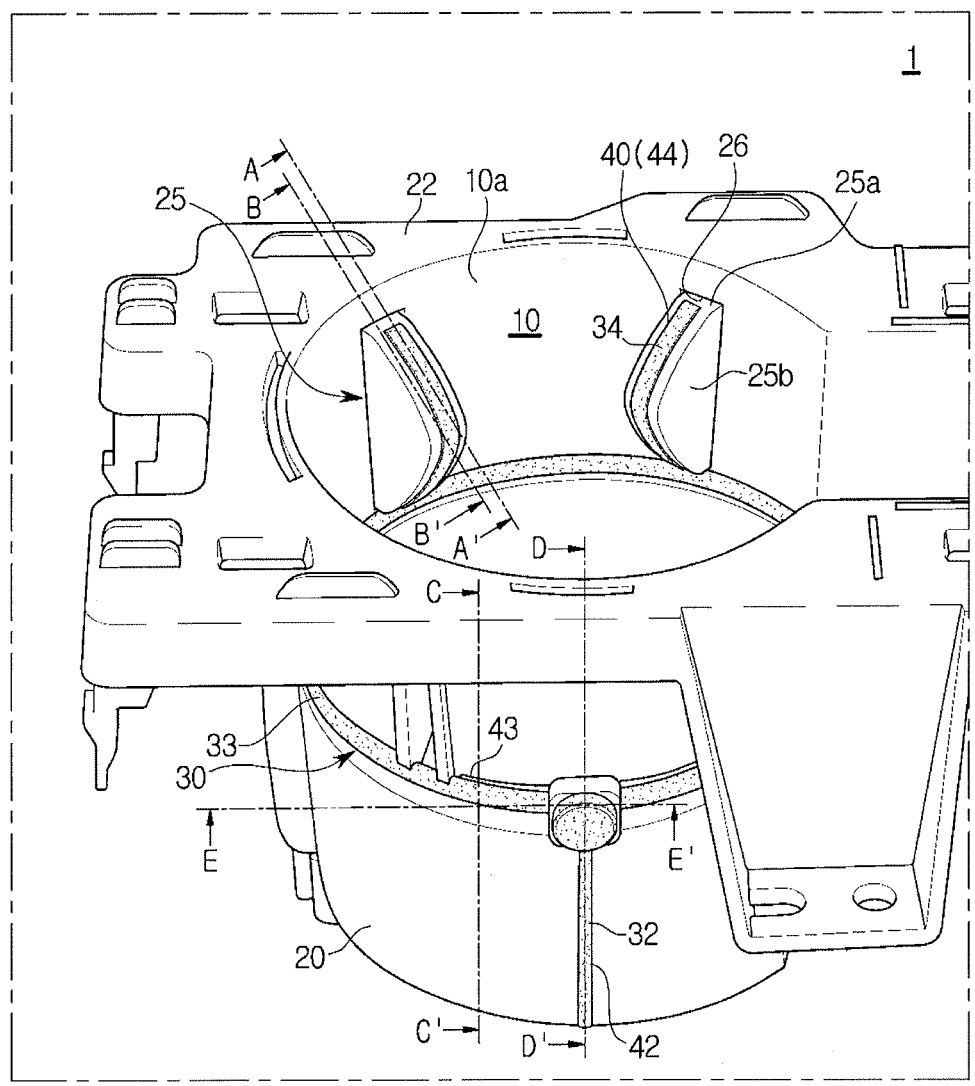
FIG. 1 is a view of a cup holder in accordance with an exemplary embodiment of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms used herein are merely to describe a specific embodiment, and do not limit the present invention. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the invention. The term "and/or" encompasses combinations of a plurality of items or any one of the plurality of items.

In the following description, a vehicle refers to various devices for transporting a subject such as a person, an object, or an animal from a departure point to a destination. Vehicles may include vehicles that run on roads or tracks, ships that move over the sea or river, and airplanes that fly through the sky using the action of air.

A vehicle traveling on a road or a track may move in a predetermined direction in accordance with the rotation of at least one wheel, and may include, for example, a three or four wheeled vehicle, a construction machine, a two wheeled vehicle, a motorized device, bicycle, and a train running along a track.

Hereinafter, exemplary embodiments of the present invention will be described in detail with reference to the accompanying drawings.

Figure 2:
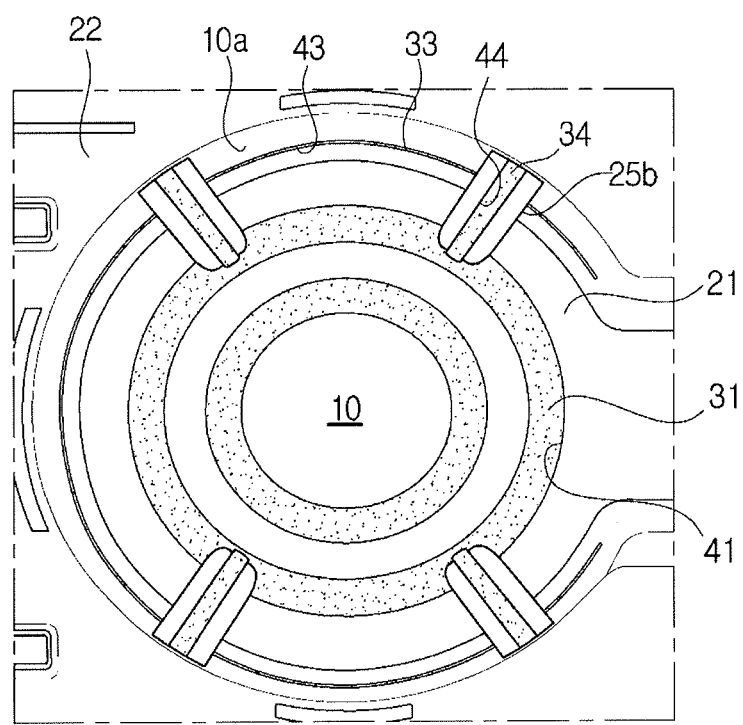
FIG. 2 is a plan view of a cup holder in accordance with an exemplary embodiment of the present invention.
Figure 3:
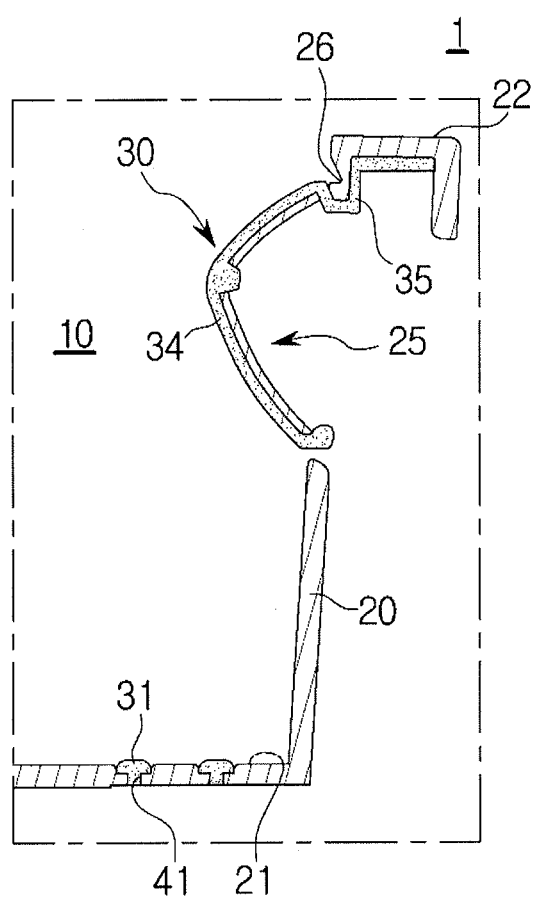
FIG. 3 is a cross-sectional view of A-A' of FIG. 1, illustrating a cross-sectional view of a cup holder provided with an elastic member in accordance with an exemplary embodiment of the present invention.
Figure 4:
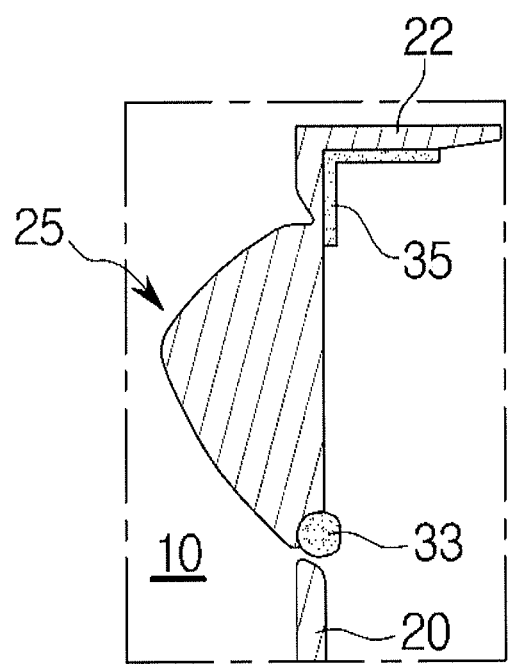
FIG. 4 is a cross-sectional view of B-B' of FIG. 1, illustrating a cross-sectional view of a guide of a cup holder in accordance with an exemplary embodiment of the present invention.
Figure 5:
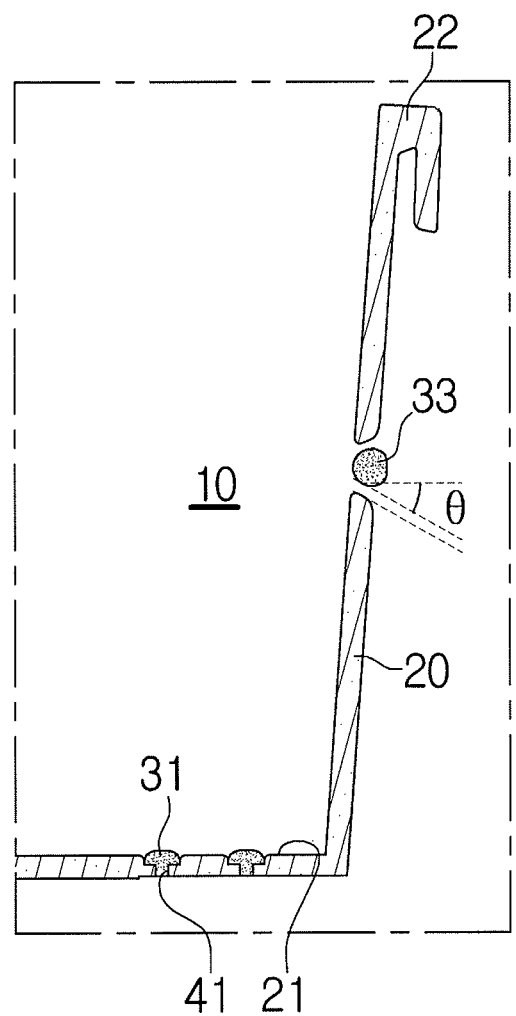
FIG. 5 is a cross-sectional view of C-C' of FIG. 1, illustrating a cross-sectional view of a cup holder in accordance with an exemplary embodiment of the present invention.
Figure 6:
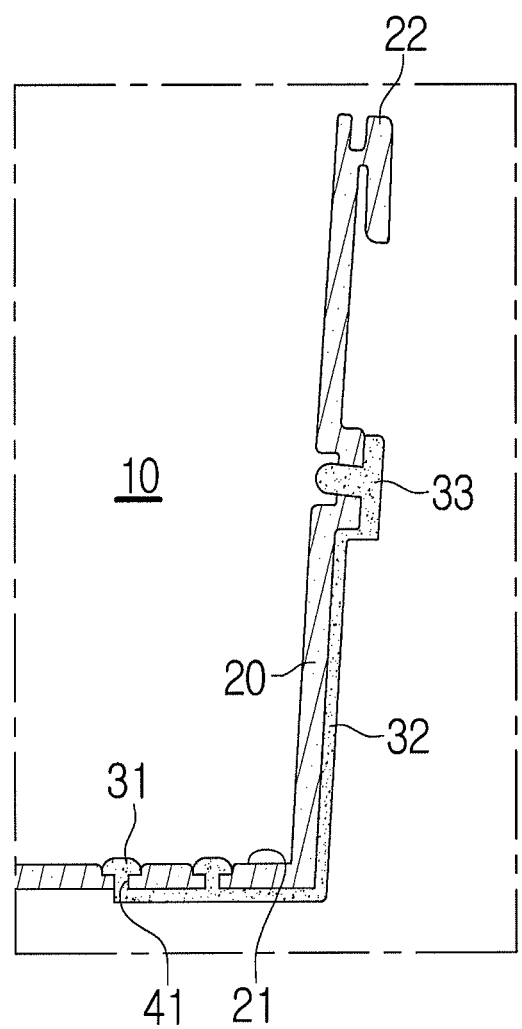
FIG. 6 is a cross-sectional view of D-D' of FIG. 1, illustrating a cross-sectional view of a cup holder provided with an elastic member in accordance with an exemplary embodiment of the present invention.
Figure 7:
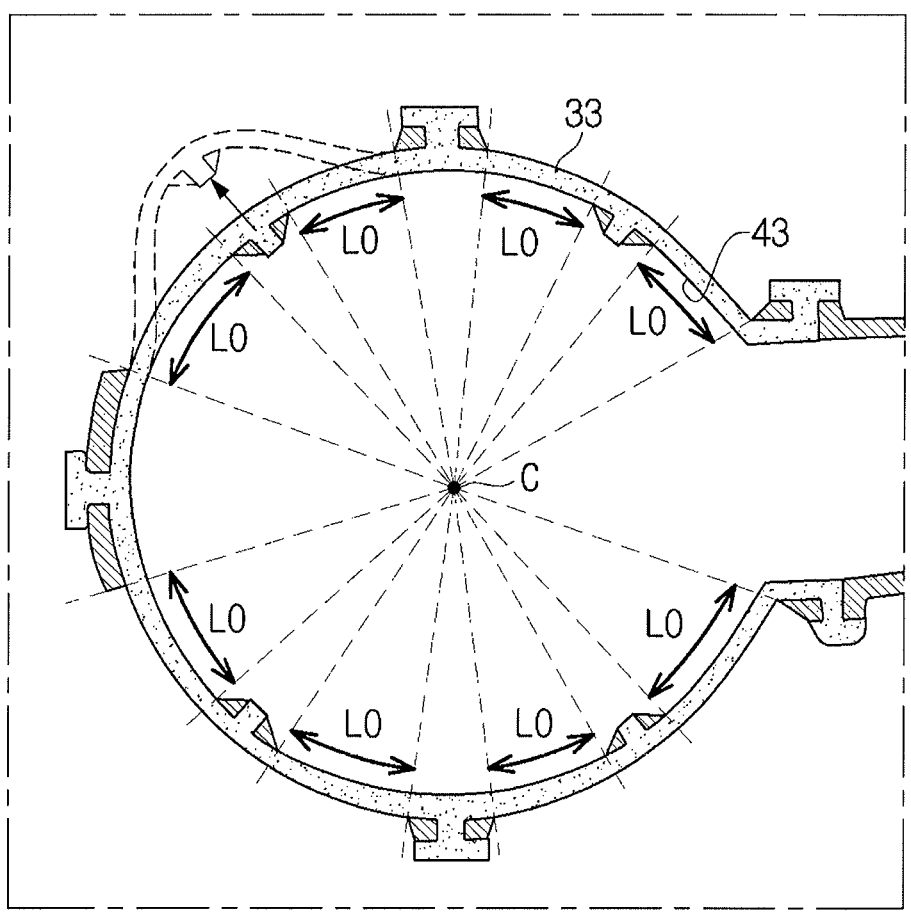
FIG. 7 is a cross-sectional view of E-E' of FIG. 1, illustrating a cross-sectional view of a cup holder provided with an elastic member in accordance with an exemplary embodiment of the present invention.
Figure 8:
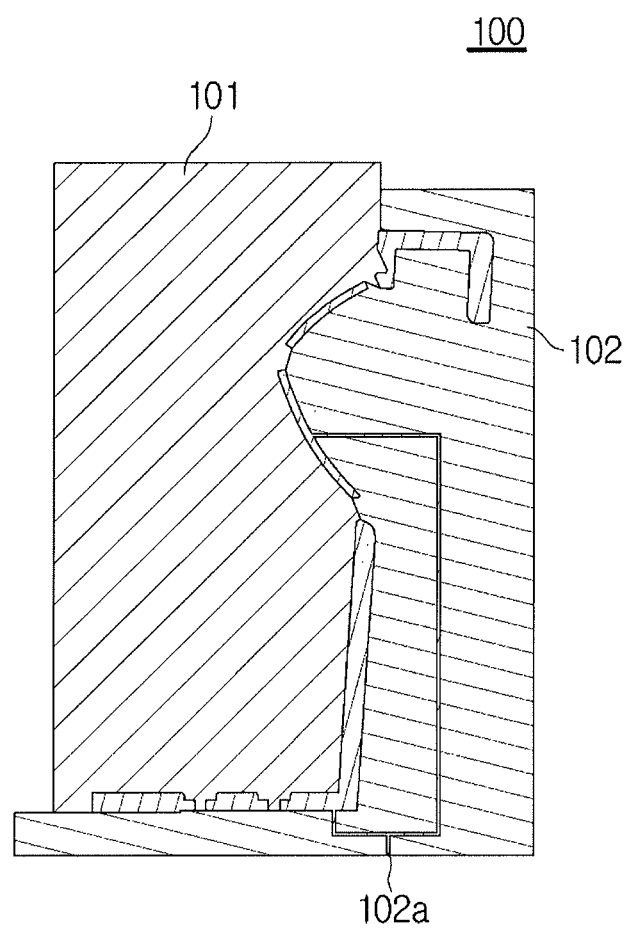
FIG. 8, FIG. 9, FIG. 10, FIG. 11 and FIG. 12 are views illustrating a process of manufacturing a cup holder in accordance with an exemplary embodiment of the present invention.
Figure 9:
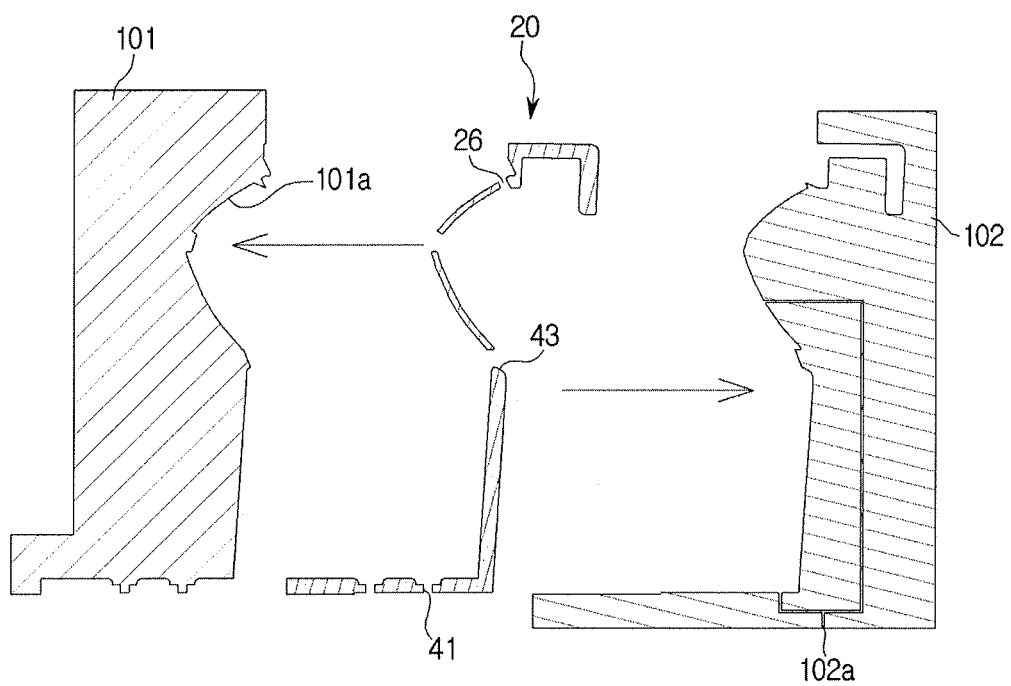

FIG. 1 is a view of a cup holder in accordance with an exemplary embodiment of the present invention, FIG. 2 is a plan view of a cup holder in accordance with an exemplary embodiment of the present invention, FIG. 3 is a cross-sectional view of A-A' of FIG. 1, illustrating a cross-sectional view of a cup holder provided with an elastic member in accordance with an exemplary embodiment of the present invention, FIG. 4 is a cross-sectional view of B-B' of FIG. 1, illustrating a cross-sectional view of a guide of a cup holder in accordance with an exemplary embodiment of the present invention, FIG. 5 is a cross-sectional view of C-C' of FIG. 1, illustrating a cross-sectional view of a cup holder in accordance with an exemplary embodiment of the present invention, FIG. 6 is a cross-sectional view of D-D' of FIG. 1, illustrating a cross-sectional view of a cup holder provided with an elastic member in accordance with an exemplary embodiment of the present invention, and FIG. 7 is a cross-sectional view of E-E' of FIG. 1, illustrating a cross-sectional view of a cup holder provided with an elastic member in accordance with an exemplary embodiment of the present invention.

Referring to FIG. 1 to FIG. 7, a cup holder 1 includes a holder body 20 having a receiving space 10 therein, a guide 25 which is movable to the receiving space 10 inside of the holder body 20, and an elastic member 30 disposed on the holder body 20 and the guide 25.

The holder body 20 may include a cylindrical shape having an opening 10a on an upper surface. A receiving space 10 is formed in the holder body 20. A cup may be inserted into the receiving space 10 of the holder body 20 and stored therein. The holder body 20 may include an upper surface 22 formed to extend outwardly of the opening 10a. The upper surface 22 of the holder body 20 may be formed flat. The upper surface 22 of the holder body 20 may be provided as a flange.

The bottom surface 21 of the holder body 20 may be formed in a disc shape. The bottom surface 21 of the holder body 20 may be formed in a shape corresponding to the opening 10a on the upper side of the holder body 20. The bottom surface 21 may be formed with an elastic member mounting portion 40 formed at least partially open to provide an elastic member 30 to be described later.

Although the holder body 20 of the present invention is illustrated as having one receiving space 10, the spirit of the present invention is not limited thereto. For example, at least two or more storage spaces may be formed in a holder body.

The guide 25 is configured to protrude inside the receiving space 10 of the holder body 20. The guide 25 is disposed to protrude toward the internal center of the receiving space 10 to be able to contact the side surface of the cup accommodated in the receiving space 10 supporting the cup.

The elastic member 30 may provide an elastic restoring force so that the guide 25 may be elastically protruded. The elastic member 30 is disposed to be exposed to at least a portion of the holder body 20 and the guide 25. The elastic body 30 may be integrally formed by injection molding to be exposed to at least a portion of the holder body 20 and the guide 25.

The guide 25 may be disposed in plural at a predetermined interval in the circumferential direction in the receiving space 10 of the holder body 20. In an exemplary embodiment of the present invention, four guides 25 are disposed symmetrically at intervals of 90 degrees in the receiving space 10, but the spirit of the present invention is not limited thereto. For example, the guides may be provided in various numbers.

The guide 25 has a predetermined thickness. The guide 25 is configured to protrude to the inside of the receiving space 10 of the holder body 20 when no external force is applied. The guide 25 is moved to the outside of the receiving space 10 of the holder body 20 when an external force is applied to the guide 25 by inserting a cup into the receiving space 10 of the holder body 20. The upper end portion of the guide 25 may be connected to the holder body 20 by a hinge 26. The guide 25 is rotatable by a hinge 26. The hinge 26 between the upper end portion of the guide 25 and the holder body 20 is the center of rotation of the guide 25, and the guide 25 may move to the inside and outside of the receiving space 10.

The guide 25 may include a curved surface. The guide 25 includes a pair of side surfaces 25b extending toward the center of holder body 20, a front surface 25a connecting the pair of side surfaces 25b and forming a curved surface protruding in a forward direction, and an elastic member mounting portion 40 having an opening formed on at least a portion of the front surface 25a.

The front surface 25a of the guide 25 may be formed in a rounded shape that is formed as a curved surface and protrudes toward a center of the holder body 20 at a predetermined portion. The side surface 25b may be formed in a flat surface to be substantially perpendicular to the internal surface of the holder body 20 on both sides of the front surface 25a. The guide 25 may be formed integrally with the holder body 20.

The guide 25 may be formed of the same material as the holder body 20. The guide 25 may be formed of a hard material. For example, the material of the guide 25 may include a synthetic resin.

The holder body 20 may be injection molded with polypropylene (PP) or ABS (acrylonitrile-butadiene-styrene) resin. The guide 25 may be injection molded with polypropylene (PP) or ABS (acrylonitrile-butadiene-styrene) resin.

The elastic member mounting portion 40 formed by recessing a portion of the front surface 25a may be configured so that the elastic member 30 is provided.

The elastic member 30 may be exposed to at least a portion of the external circumferential surface of the holder body 20. The elastic body 30 may be exposed to at least a portion of the external surface of the guide 25.

The elastic member 30 may include an elastic material. The elastic member 30 may be formed of thermoplastic olefin (TPO) or thermoplastic elastomer (TPE) as a thermoplastic resin.

To improve the initial restoring force (elastic force) after the injection molding of the elastic member 30, it is preferable to use a material whose shrinkage rate after molding is set to a predetermined level or more, for example, a shrinkage ratio of 1.5% or more. To improve the initial restoring force of the elastic member 30, the elastic member 30 may include a material whose shrinkage rate (%) after molding is equal to or more than the permanent tensile strain (%, length change rate after 100% tensioning+80 degrees+ 500 hours).

The elastic modulus of the elastic member 30 may be controlled by the elastic modulus of the material of the elastic member 30 (in conjunction with the hardness, the thickness, the width, the molding area and the shape of the elastic member 30). The color and embossment of the elastic member 30 may be made different from those of the guide 25 and the holder body 20. In the present case, the elastic member 30 may perform a decorative function of improving the appearance of the cup holder 1.

That is, the elastic member 30 may improve the supporting force of the cup holder 1, prevent slippage, and play a decorative role through the color and embossment of the material.

The elastic member mounting portion 40 configured to mount the elastic member 30 may include a first opening 41 formed in the circumferential direction on the bottom surface 21 of the holder body 20, a second opening 42 formed in the vertical direction on the side surface of the holder body 20, a third opening 43 formed in the horizontal direction on the side surface of the holder body 20, and an opening 44 formed on the front surface of the guide 25.

The elastic member 30 may be integrally connected to the elastic member mounting portion 40. The elastic member 30 may include a first elastic body 31 disposed in the first opening 41 formed on the bottom surface 21 of the holder body 20, a second elastic member 32 disposed in the second opening 42 formed on the side surface of the holder body 20 in the vertical direction, a third elastic member 33 disposed in the third opening 43 formed on the center of the side surface of the holder body 20 in the horizontal direction, and a fourth elastic member 34 disposed in the opening 44 formed on the front surface of the guide 25.

The first opening 41 may be formed in a circular ring shape on the bottom surface 21 of the holder body 20. At least one or more first openings 41 may be formed on the bottom surface 21 of the holder body 20. In the exemplary embodiment of the present invention, the first opening is illustrated as being two concentric circles, but the spirit of the present invention is not limited thereto.

The first elastic member 31 disposed on the bottom surface 21 of the holder body 20 may provide a function of preventing slippage and a function of decoration for the cup holder 1.

The first elastic member 31, second elastic member 32, third elastic member 33, and the fourth elastic member 34 may be integrally connected to each other. The elastic member 30 may be formed by integrally connecting the first elastic member 31 disposed on the bottom surface 21 of the holder body 20, the second elastic member 32 connected to the first elastic member 31 and vertically disposed on the side surface of the holder body, the third elastic member 33 connected to the second elastic member 32 and horizontally disposed on the center of side surface of the holder body 20, and fourth elastic member 34 connected to the third elastic member 33 and disposed on the front surface of the guide.

The opening 44 formed on the front surface 25a of the guide 25 may be elongated vertically. The fourth elastic member 34 disposed in the opening 44 of the guide 25 may be formed in a substantially striped shape.

The fourth elastic member 34 disposed on the guide 25 may further include a fifth elastic member 35 overmolded behind the hinge 26 at the upper end portion of the guide 25. The fifth elastic member 35 may be connected to the fourth elastic member 34 to be integrally formed. The fifth elastic member 35 may be formed by overmolding the rear surface of the hinge 26 of the guide 25. Since the elastic member 30 is superimposed over the hinge 26 of the guide 25 and the upper surface 22 of the holder body 20, the durability of the hinge 26 may be secured. The fifth elastic member 35 is disposed under the upper surface 22 of the cup holder 1 and is not exposed. The first elastic member 31, the second elastic member 32, the third elastic member 33, and the fourth elastic member 34 are configured to be exposed to the outside, and have various colors and possible embossments to make them separate from each other.

As shown in FIG. 7, the guide 25 is configured to be movable toward the inside and outside of the holder body 20 by the hinge 26. One side of the guide 25 may be connected to the holder body 20 by a hinge 26 and the other side of the guide 25 may be connected to the holder body 20 by a third elastic member 33 disposed in the horizontal direction on the center of the side surface of the holder body 20.

Four guides 25 may be disposed symmetrically on the circular holder body 20. The guide 25 may be connected to the third elastic member 33 of the holder body 20. The guide 25 may be disposed with elastic member fixing portions wherein the initial free lengths L0 of the elastic members 30 adjacent to the guide 25 are equal to each other. The elastic member fixing portion may include various shapes and various thicknesses.

The angle θ of the third opening 43 in which the third elastic member 33 is disposed may be 15 degrees or more so that the elastic member 30 may be restored to an initial position even when the elastic member 30 is wobbled or sagged while the elastic member 30 is restored after being stretched by the cup inserted into the receiving space 10.

A container including a cup may be stably supported in the receiving space 10 of the cup holder 1 by the elastic member 30 disposed on the holder body 20 and the elastic member mounting portion 40 of the guide 25.

FIG. 8 to FIG. 12 are views illustrating a process of manufacturing a cup holder in accordance with an exemplary embodiment of the present invention.

Referring to FIG. 8 to FIG. 12, the method of manufacturing the cup holder 1 may include a first injection molding for forming the holder body 20 integrally provided with the guide 25 by a first mold 100, inserting the holder body 20 into a second mold 200 after the first injection molding is completed, and a second injection molding for integrally forming the elastic member 30 onto the holder body 20.

A cavity 101a is formed between an upper mold 101 and a lower mold 102 of the first mold 100, and an injection port 102a connected to the cavity 101a for injecting the injection material is formed in the lower mold 102. Although the injection port 102a is formed in the lower mold 102 in the exemplary embodiment of the present invention, the spirit of the present invention is not limited thereto. For example, the injection port may be formed in at least one of the upper mold and the lower mold.

The cavity 101a formed in the first mold 100 is formed in a shape corresponding to the holder body 20 in which the guide 25 is integrally formed.

The cavity 101a may have a shape corresponding to the elastic member mounting portion 40 for integrally forming the elastic member 30. The cavity 101a may be formed with a shape corresponding to the first opening 41, the second opening 42, the third opening 43, and the fourth opening 44 of the elastic member mounting portion 40, and the hinge 26 of the guide 25.

Molten resin is injected into the cavity through the injection port 102a of the lower mold 102, and a first injection molding product, that is, the holder body 20 in which the guide 25 is integrally disposed is formed.

Figure 10:
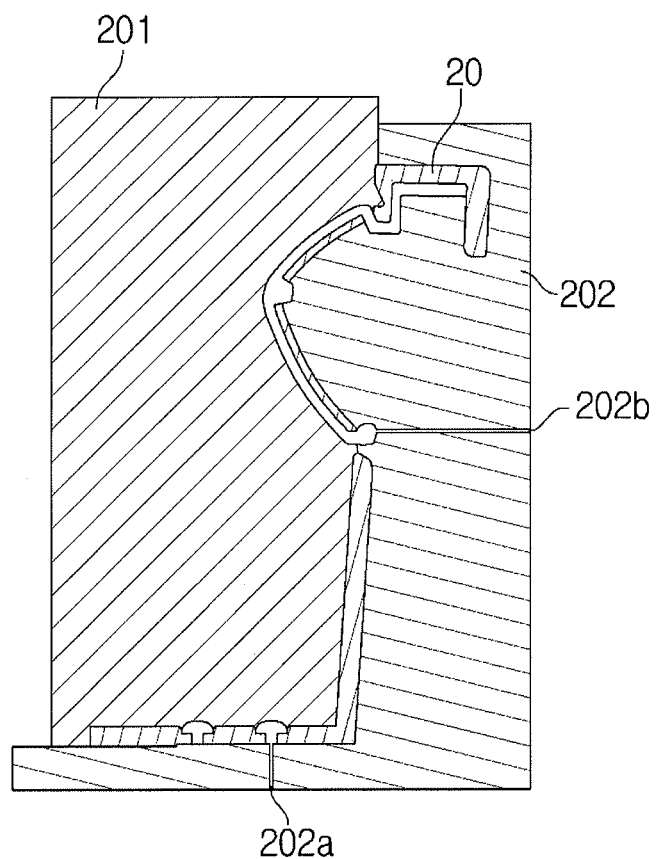
Figure 11:
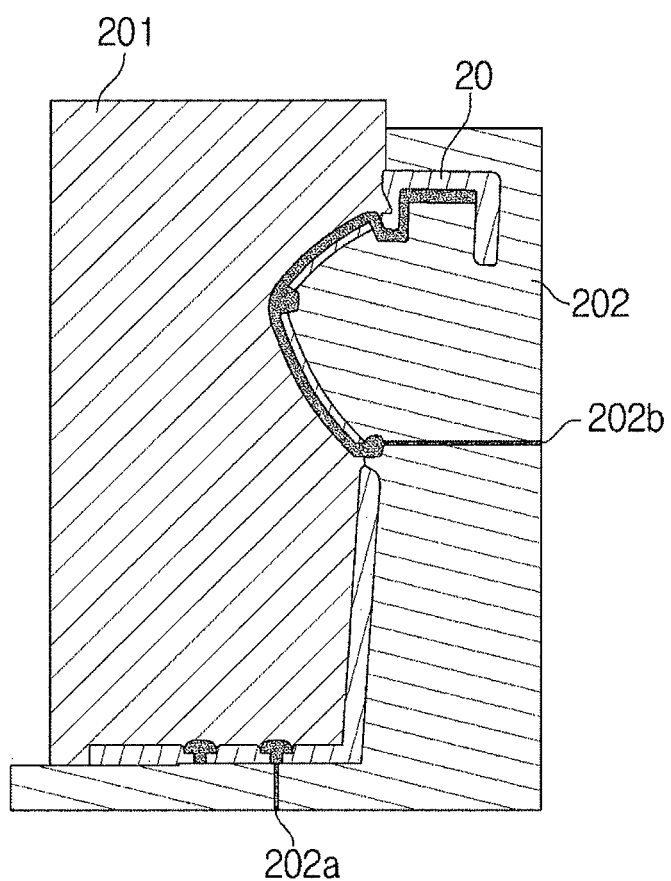
Figure 12:
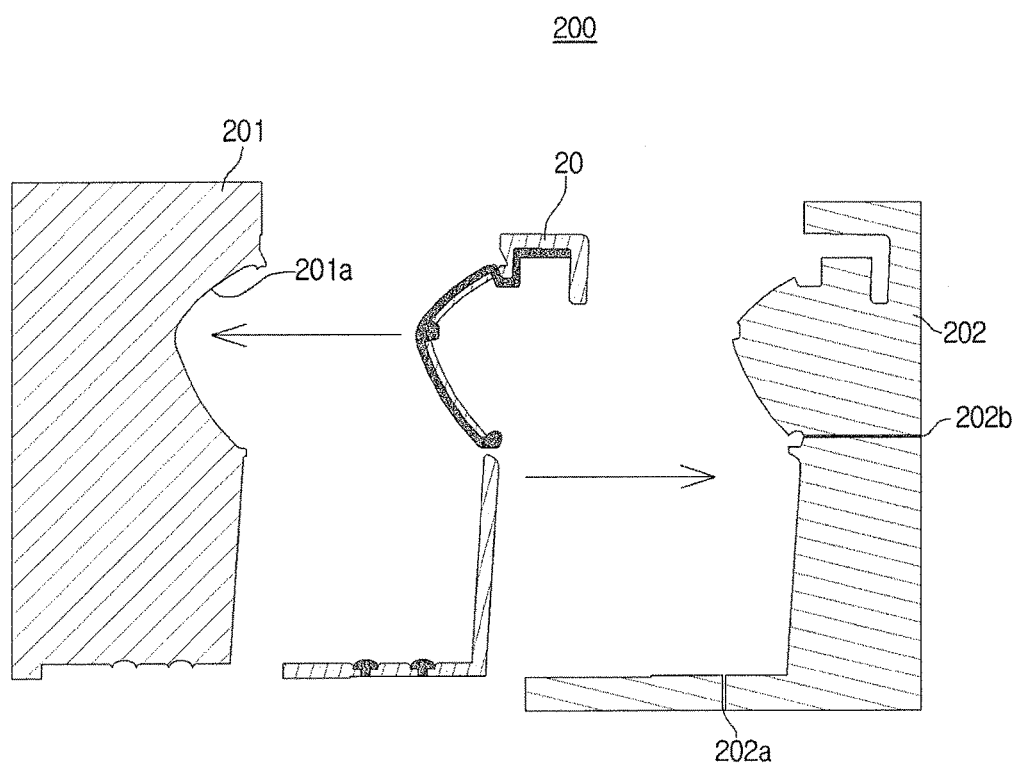

As shown in FIG. 10 to FIG. 12, when the first injection molding is completed through the first mold 100, the holder body 20 integrally formed with the guide 25 is placed in a cavity 201*a* of a second mold 200.

The cavity 201*a* is disposed between an upper mold 201 and a lower mold 202 of the second mold 200. In the cavity 201*a*, the holder body 20, which is the first injection molding product, is inserted.

The lower mold 202 of the second mold 200 has injection ports 202*a* and 202*b* connected to the cavity 201*a* for injecting an elastic material. The injection ports 202*a* and 202*b* include a first injection port 202*a* disposed at a position corresponding to the first opening 41 formed in the bottom surface 21 of the holder body 20, and a second injection port 202*b* disposed at a position corresponding to the third opening 43 formed in the side surface of the holder body 20.

Although two injection ports 202*a* and 202*b* are formed in the lower mold 202 in the exemplary embodiment of the present invention, the spirit of the present invention is not limited thereto. For example, a plurality of injection ports may be disposed in the upper mold.

Further, according to the exemplary embodiment of the present invention, the second mold 200 is provided with the upper mold 201 and the lower mold 202 so that the cavity having the shape corresponding to the holder body 20 in which the elastic member 30 is integrally formed. However, the first and second molds 100 and 200 may include a plurality of molds for solving various problems including an undercut shape and the like.

A molten resin of an elastic material is injected into the cavity 201*a* between the upper mold 201 and the lower mold 202 through the first injection port 202*a* and the second injection port 202*b* of the lower mold 202. Then, a second injection molding product, that is, the cup holder 1 in which the elastic member 30 is integrally provided is formed.

The elastic member 30 may be integrally formed to be exposed to at least a portion of the holder body 20 and the guide 25 of the cup holder 1.

As is apparent from the above description, it is possible to reduce the number of components and the assembling process, and the lower cost. Also, it is possible to prevent slippage of the cup and provide a sense of quality to improve the appearance of the holder.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various alternatives and modifications thereof. It is intended that the scope of the invention be defined by the Claims appended hereto and their equivalents.

What is claimed is:

1. A cup holder for a vehicle comprising:
   a holder body having an opening on an upper surface thereof and a receiving space formed therein;
   a guide configured to be movable to inside of the holder body; and
   an elastic member provided to be exposed to at least one portion of external circumferential surfaces of the guide and the holder body,
   wherein the guide and the elastic member are integrally formed with the holder body by injection molding,
   wherein the elastic member is formed to be exposed to at least one portion of a front surface of the guide to overmold a rear upper side of the guide, and
   wherein the elastic member comprises a first elastic member integrally formed on a side surface of the holder body in a horizontal direction.

2. The cup holder of claim 1, wherein the guide comprises:
   a pair of side surfaces extending toward a center of the holder body;
   the front surface connecting the pair of side surfaces and forming a curved surface protruding in a forward direction thereof; and
   an elastic member mounting portion including an opening formed on at least a portion of the front surface of the guide.

3. The cup holder of claim 2, wherein the guide further comprises a hinge configured to be rotatable with respect to the holder body.

4. The cup holder of claim 3, wherein the elastic member is overmolded behind of the hinge.

5. The cup holder of claim 3, wherein the elastic member mounting portion further comprises:
   a first opening formed on a bottom surface of the holder body in a circumferential direction thereof;
   a second opening formed on the side surface of the holder body in a vertical direction thereof; and
   a third opening formed on the side surface of the holder body in a horizontal direction thereof.

6. The cup holder of claim 5, wherein the elastic member comprises:
   a second elastic member provided at the first opening;
   a third elastic member provided at the second opening; and
   a fourth elastic member provided at the opening of the guide.

7. The cup holder of claim 6, wherein each of the first opening and the second opening is provided in plural.

8. The cup holder of claim 1, wherein the elastic member comprises at least one of thermoplastic olefin and thermoplastic elastomer.

9. A method of manufacturing a cup holder comprising:
   a first injection molding for forming a holder body by injecting a polypropylene material into a first mold;
   placing the holder body inside a second mold; and
   a second injection molding for integrally forming an elastic member by injecting an elastic material into the second mold, wherein the elastic member is provided on at least a portion of the holder body,
   wherein the holder body includes an elastic member mounting portion provided to be open such that the elastic member is formed integrally with the holder body, and
   wherein the elastic member mounting portion comprises a first opening formed on a bottom surface of the holder body in a circumferential direction thereof, a second opening formed on a side surface of the holder body in a vertical direction thereof, and a third opening formed on the side surface of the holder body in a horizontal direction thereof.

10. The method of claim 9, wherein the elastic member is exposed to at least a portion of an external circumferential surface of the holder body.

11. The method of claim 9 further comprises forming a guide when forming the holder body, wherein the guide has a hinge configured to allow that the guide is configured to move toward inside of the holder body.

12. The method of claim 11, wherein the elastic ember is exposed to at least a portion of an external surface of the guide.

13. The method of claim 11, wherein the guide comprises:
- a pair of side surfaces extending toward a center of the holder body;
- a front surface connecting the pair of side surfaces and forming a curved surface protruding in a forward direction thereof; and
- the elastic member mounting portion including a fourth opening formed on at least a portion of the front surface.

14. The method of claim 11, wherein the elastic member is overmolded behind of the hinge.

15. The method of claim 9, wherein each of the first opening and the second opening is provided in plural.

* * * * *